(12) United States Patent
Khudyakov et al.

(10) Patent No.: US 6,621,970 B2
(45) Date of Patent: Sep. 16, 2003

(54) UV-CURABLE OPTICAL FIBER COATING COMPOSITION INCLUDING FULLERENES

(75) Inventors: Igor V. Khudyakov, Hickory, NC (US); Michael B. Purvis, Hickory, NC (US)

(73) Assignee: Alcatel, Paris (FR)

( * ) Notice: Subject to any disclaimer, the term of this patent is extended or adjusted under 35 U.S.C. 154(b) by 343 days.

(21) Appl. No.: 09/818,569

(22) Filed: Mar. 28, 2001

(65) Prior Publication Data

US 2003/0147613 A1 Aug. 7, 2003

(51) Int. Cl.$^7$ .............................. G02B 6/02; B05D 5/06
(52) U.S. Cl. ....................... 385/128; 385/123; 385/127; 427/163.2
(58) Field of Search ................................ 385/123, 127, 385/128, 141; 427/162, 163.2, 163.4

(56) References Cited

U.S. PATENT DOCUMENTS

| | | | |
|---|---|---|---|
| 3,980,390 A | 9/1976 | Yamamoto et al. ...... 385/123 X |
| 4,351,657 A | 9/1982 | Kimura et al. ................ 65/3.11 |
| 4,512,281 A | 4/1985 | Yamanishi et al. ......... 118/627 |
| 4,531,959 A | 7/1985 | Kar et al. ..................... 65/3.11 |
| 4,539,219 A | 9/1985 | Yamanishi et al. ........... 427/32 |
| 4,792,347 A | 12/1988 | Deneka et al. ................ 65/3.11 |
| 4,867,775 A | 9/1989 | Cain et al. .................... 65/3.43 |
| 5,232,810 A | * 8/1993 | Ziolo ...................... 430/108.1 |
| 5,281,653 A | 1/1994 | Thomann et al. ........... 524/490 |
| 5,302,474 A | 4/1994 | Shackle ....................... 429/192 |
| 5,307,187 A | 4/1994 | Sunohara et al. ............. 359/51 |
| 5,530,206 A | 6/1996 | Robert et al. ......... 174/102 SC |
| 5,672,675 A | * 9/1997 | Green et al. ................. 528/307 |
| 5,759,725 A | 6/1998 | Hirao et al. ................... 430/58 |
| 5,870,194 A | 2/1999 | Cordova et al. ............. 356/350 |
| 5,974,214 A | 10/1999 | Shacklette et al. ............ 385/50 |
| 5,989,627 A | * 11/1999 | Blyler et al. .............. 427/163.2 |
| 6,057,034 A | 5/2000 | Yamazaki et al. ........... 428/378 |
| 6,323,255 B1 | * 11/2001 | Snowwhite .................. 522/120 |
| 6,518,394 B2 | * 2/2003 | Wei et al. .................... 528/422 |

FOREIGN PATENT DOCUMENTS

| | | | |
|---|---|---|---|
| EP | 0 582 221 A1 | 2/1994 | |
| EP | 1245546 A2 | * 10/2002 | ........... C03C/25/28 |
| WO | WO 94/19423 A1 | 9/1994 | |
| WO | WO 01/60756 A1 | 8/2001 | |

OTHER PUBLICATIONS

U.S. Patent application Publication No. U.S. 2002/0168164A1 (Bishop et al.) published Nov. 14, 2002.*
U.S. Patent application Publication No. U.S. 2003/0049446 A1 (Schissel et al.), published Mar. 13, 2003.*
Patent Abstracts of Japan vol. 1995, No. 08, Sep. 29, 1995 & JP 07133139 A (Show a Electric Wire & Cable Co Ltd, May 23, 1995 *abstract*.

* cited by examiner

*Primary Examiner*—Brian Healy
(74) *Attorney, Agent, or Firm*—Sughrue Mion, PLLC

(57) ABSTRACT

A composition for coating an optical waveguide, more specifically, an optical fiber, and optical fibers coated therewith are disclosed. The coating composition is a radiation curable composition containing: a radiation curable oligomer, a reactive diluent or diluents, a free radical photoinitiator, and fullerenes.

25 Claims, 1 Drawing Sheet

UV-CURABLE OPTICAL FIBER COATING COMPOSITION INCLUDING FULLERENES

BACKGROUND

The invention relates to a curable composition suitable for coating ribbon matrices and glass surfaces, specifically, coating optical waveguides such as optical fibers, the coating composition having a faster cure time than was previously possible.

Optical fibers made from drawn glass have been used as a reliable transmission medium in telecommunications cables. Glass optical fibers are widely used because they have the ability to carry large amounts of information over long distances.

Optical fiber waveguides have been coated with plastic compositions of various materials in order to protect the fiber and increase its tensile strength. Optical glass fibers are generally coated with two superposed coatings. The coating which contacts the glass is a relatively soft, primary coating that must satisfactorily adhere to the fiber and be soft enough to resist microbending especially at low service temperatures. The outer, exposed coating is a much harder secondary coating that provides the desired resistance to handling forces yet must be flexible enough to enable the coated fiber to withstand repeated bending without cracking the coating.

Optical fiber coating compositions, whether they are either primary or secondary coatings, generally comprise before cure an ethylenically-unsaturated monomer or oligomer dissolved or dispersed in a liquid ethylenically-unsaturated medium and a photoinitiator, or blend of photoinitiators. The coating composition is typically applied to the optical glass fiber in liquid form and then exposed to actinic radiation to effect cure.

In practice, the most commonly used coatings have been derived from acrylates. The most widely used acrylates are those which are capable of ultraviolet radiation curing at high speed since the coatings are normally applied immediately after the glass fiber has been drawn from the molten state. Typical of such acrylates are multifunctional or (meth) acrylate terminated monomers and oligomers. The secondary coating is most often urethane-acrylate or epoxy-acrylate copolymers which also may be cured by ultra-violet radiation.

Coatings are applied to the fiber in-line during fiber drawing. As the state of fiber drawing technology has allowed for increased draw speeds to effectuate longer and thinner optical fibers, the need for coating compositions that can cure at faster rates coincident with the faster draw speeds has become more urgent. Thus, as draw speeds have increased, a need has developed for materials that cure at faster rates than available with traditional technology.

Fullerenes are hollow molecules composed only of carbon atoms which constitute an allotropic form of carbon. The skeleton structure has a steric configuration composed of a carbon ring, such as a 5-membered carbon ring or a 6-membered carbon ring. The pentagons or hexagons are required in order to allow the curvature and eventual closure of the closed surface upon itself. For further information concerning the structure of fullerenes, see, e.g., H. W. Kroto, et al., 91 CHEMICAL REVIEWS, 1213–1235 (1991).

U.S. Pat. No. 5,281,653 to Thomann, et al. describes polymer compositions produced by combining a polymer and a sufficient amount by weight of fullerenes to result in a minor change or modification in the viscoelastic properties of the fullerene-polymer compositions compared to the unmodified polymer.

U.S. Pat. No. 5,302,474 to Shackle describes solid electrochemical cells containing a solid reaction cured polymer electrolyte and a cathode composed of radiation cured polymer electrolyte and fullerene.

U.S. Pat. No. 5,530,206 to Robert, et al. discloses a coaxial cable intended to be used in the field of telecommunications comprising a semiconductor composite material comprising an undoped polymeric conductor. The undoped polymeric conductor is selected from an electronic polymeric conductor chosen from polymers and copolymers based on fullerene. The coaxial cable absorbs electromagnetic interference generated by the electronic components or connecting cables in telecommunications systems.

U.S. Pat. No. 5,759,725 to Hirao, et al. describes a photoconductor comprising a material selected from the group of fullerenes and their derivatives arranged in an amorphous structure. The fullerenes yield a photoconductor having high charge-generating efficiency by photo-irradiation.

The present inventors have found that a liquid, radiation curable composition having a fast cure time can be provided by adding fullerenes to a composition comprising a radiation curable oligomer, a free radical photoinitiator, and a reactive diluent.

SUMMARY

There is provided a liquid, radiation curable composition for coating an optical waveguide, said composition comprising (a) a radiation curable oligomer, (b) a free radical photoinitiator, (c) a reactive diluent or mixture of reactive diluents, and (d) fullerenes.

The present coating composition for optical fibers can cure at faster rates to parallel faster draw speeds.

DETAILED DESCRIPTION

Figure 1:
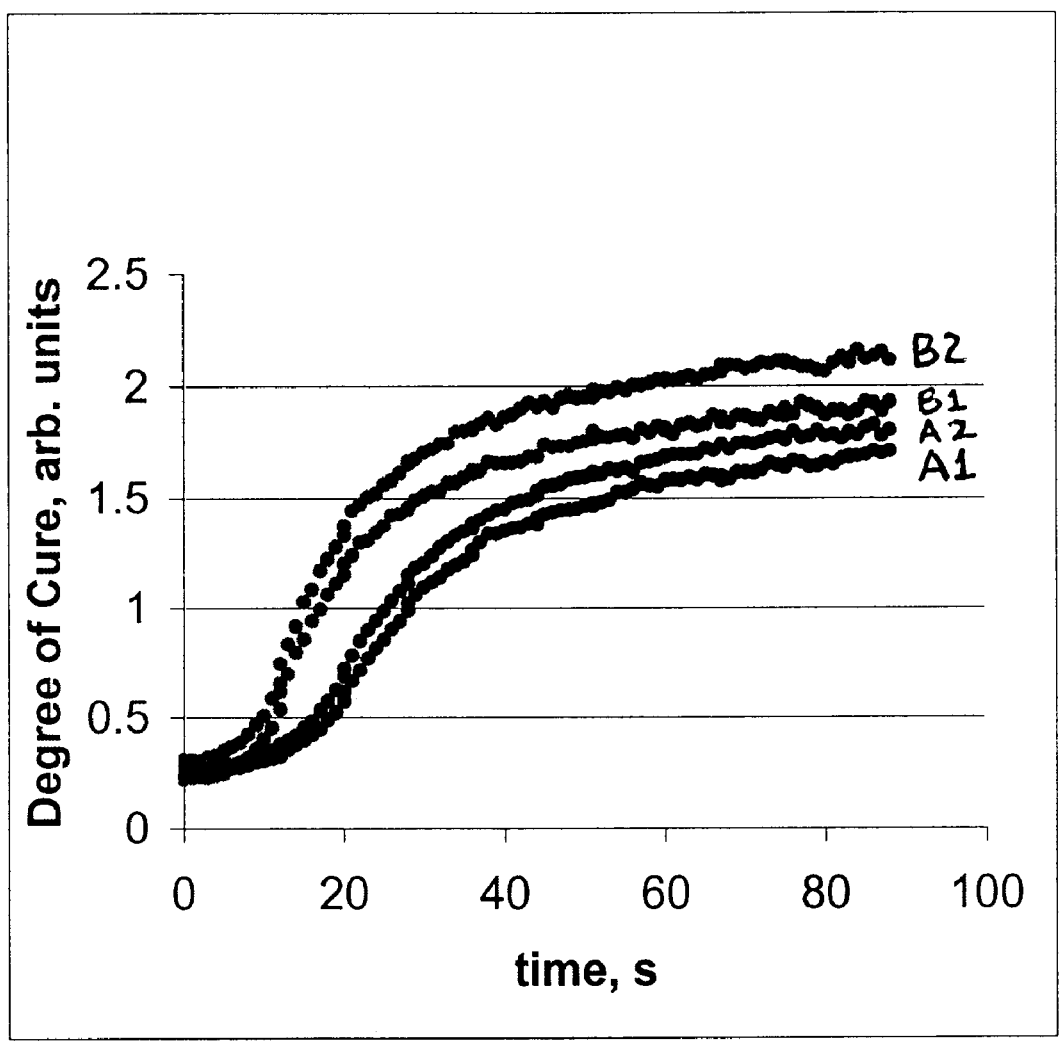
FIG. 1 is a graph comparing, in terms of degree of cure versus time, a primary coating composition (A) excluding fullerenes and a primary coating composition (B) including 1.5 wt % of saturated solution of fullerenes in styrene.

Coating compositions in accordance with the present invention may advantageously be used as primary and/or secondary coatings for optical fibers.

As used herein, the term "primary coating" is defined as that coating which directly contacts the glass portion of the optical fiber. The uncured primary coating should be liquid at room temperature. The uncured primary coating should have a viscosity suitable for high speed processing, and the uncured primary coating should have a high cure speed. The cured primary coating should exhibit good adhesion to glass to prevent premature delamination of the coating from the glass portion of the optical fiber. The cured primary coating should have a low modulus at lower temperatures to minimize the effects of microbend attenuation due to small stresses on the optical fiber itself. The cured primary coating may have a refractive index high enough to ensure that errant signals escaping from the glass core are refracted back to the core of the optical fiber.

As used herein, the term "secondary coating" is defined as the coating which covers the primary coating on the optical fiber. The cured secondary coating should have sufficient modulus to give impact resistance and to provide a protective barrier, and give tensile strength to the optical fiber. The cured secondary coating should exhibit little physical change over a wide temperature range, good resistance to water and solvent absorption and have good color stability.

The uncured liquid primary or secondary coating composition should have a sufficiently low viscosity that the composition will be easily applied to form a continuous protective coating on the glass fibers. Examples of such viscosities include from about 1,000 to about 10,000 mPa s (25° C.), e.g., from about 2,000 to about 8,000 mPa s (25° C.). There is no particular limitation on viscosity, however, and it may be adjusted to a given application by known methods. For example, viscosity may be adjusted depending on the type of optical fiber material being formulated and the method of application.

Generally, the thickness of the cured primary or secondary coating will be dependent on the intended use of the optical fiber, although thicknesses of about 20 to 35 microns, and in particular thicknesses of about 25 to 30 microns, are suitable.

When used as primary coatings, cured coatings in accordance with the present invention may have a glass transition temperature ($T_g$) of from about −60° C. to about −10° C., for example, from about −50° C. to about −30° C., and, e.g., about −40° C., and a low modulus of elasticity of from about 0.5 MPa to about 3.0 MPa at room temperature (20° C.) and 50% relative humidity, for example, from about 1.0 MPa to about 2.0 MPa and, e.g., about 1.5 MPa.

When utilized as a secondary coating, cured coatings in accordance with the present invention may have a glass transition temperature ($T_g$) of from about 30 C to about 60° C. The cured secondary coatings may have a $T_g$ of from about 50° C. to about 80° C., for example, about 75° C. A cured secondary coating usually has a modulus of elasticity of from about 30 to about 60 MPa at around 80° C. and 50% relative humidity, for example, from about 20 to about 40 MPa, and, e.g., about 30 MPa.

The addition of fullerenes to a liquid, radiation curable composition may accelerate the cure speed of the composition. The addition of fullerenes also may allow for tailoring of the mechanical properties of the curable coating composition. For example, with the increasing addition of fullerenes to liquid, radiation curable compositions, coating toughness, glass transition temperature, $T_g$, and the coating's modulus may be increased. In general, the addition of smaller amounts of fullerenes will help to accelerate cure but will not impart undesirable hardness to the coating. The addition of higher amounts of fullerenes will result in an undesirable increase in modulus, hardness, and crosslinking.

Fullerenes or functionalized fullerenes may be added to a primary or secondary coating composition. Fullerenes may be synthesized by methods known in the art or purchased commercially. Fullerenes used in the practice of this invention have the general formula $C_{2n}$, where n is greater than 15.

Particular fullerenes suitable for the present invention are $C_{60}$ fullerenes. $C_{60}$ fullerenes are soccer ball-shaped molecules and are composed of 60 carbon atoms. $C_{60}$ fullerenes are referred to as buckminster fullerenes or buckyballs. They are available from MER Corporation (Tucson, Ariz.), grade 99.5+% pure.

Fullerenes useful as cross-linking agents in polymers are also suitable in the present invention. Indeed, functionalized fullerene molecules, with, for example, hydroxy or amino groups as the major components of substitutions, provide a unique three-dimensional multifunctional precursor suitable for utilization as polymer cross-linking agents. Functionalized fullerenes include polyhydroxylated fullerenes, poly (amino) fullerenes, poly(aminohydroxy) fullerenes, poly (aminohydroxyacetoxy) fullerenes, poly (aminohydroxytrifluoroacetoxy) fullerenes, poly (nitrohydroxy) fullerenes, and poly(aminoacetamino) fullerenes. U.S. Pat. No. 5,177,248 to Chiang, et al. provides a complete discussion of functionalized fullerenes and a method of preparing functionalized fullerenes.

Fullerenes may be added to either a primary or secondary coating composition as a saturated solution in a polymerizable solvent, such as styrene.

Surprisingly, it has now been discovered that fullerenes, e.g. $C_{60}$ fullerenes or functionalized fullerenes, may also be added to either a primary or secondary coating composition as a saturated solution in diisocyanate, such as bis(4-isocyanatocyclohexyl)methane. Bis(4-isocyanatocyclohexyl)methane is sold as Desmodur W by Bayer of Pittsburgh, Pa. A Desmodur W solution of fullerenes has a pink color. The solubility of fullerenes in diisocyanate is comparable with the solubility of fullerenes in, for example, toluene and other aromatic solvents.

Fullerenes in the form of a saturated solution may be added to a liquid, radiation-curable composition by dissolving solid fullerenes, for example, solid, powdered fullerenes, in either a polymerizable solvent or a diisocyanate in an amount of from about 0.05 wt % to about 3 wt %, based on the weight of either the polymerizable solvent or the diisocyanate. The saturated fullerene solution is then added to a liquid, radiation-curable composition in an amount of from about 1 wt % to about 3 wt %, based on the entire weight of the curable composition. For example, fullerenes as a saturated solution in either a polymerizable solvent or a diisocyanate may be added in an amount of 1.5 wt %. The level of fullerenes in the curable composition may be extremely low, for example around 0.01 wt %, when 1.5 wt % of saturated fullerene solution in either a polymerizable solvent or a diisocyanate is added to a curable composition.

The curable coating composition includes a radiation curable oligomer, for example, a urethane acrylate oligomer. The oligomer may be synthesized by methods known in the art or purchased commercially.

A urethane acrylate oligomer may be formed by reacting a polyol, for example a diol, with a multi-functional isocyanate, for example a diisocyanate, and then end-capping with a hydroxy-functional acrylate.

The polyol may be a polyol with a number average molecular weight of about 200–10,000, such as polyether polyol, polyester polyol, polycarbonate polyol, and hydrocarbon polyol.

Polyether polyols may be homopolymers or copolymers of alkylene oxides including $C_2$ to $C_5$ alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more.

Polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis(hydroxymethyl)cyclohexane. The short chain dialkylcarbonate may be $C_1$–$C_4$ alkylcarbonates such as, for example, dimethylcarbonate and diethylcarbonate.

If necessary, polyols with a low molecular weight may be used. Examples of polyols with a low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol (a reduction product of Japanese acid), chimyl alcohol, batyl alcohol, selachyl alcohol, and dimeric acid diol.

A multi-functional isocyanate used in the present invention may be, for example, an aromatic polyisocyanate, an aromatic aliphatic polyisocyanate, an alicyclic polyisocyanate, and an aliphatic polyisocyanate.

Examples of the aromatic polyisocyanate include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanatebenzene, 2,4,6-triisocyanatetoluene, and 4,4'-diphenylmethane-2,2',5,5'-tetraisocyanate.

Examples of the aromatic aliphatic polyisocyanate include diisocyanates such as 1,3- or 1,4-xylylene diisocyanate or mixtures thereof and 1,3- or 1,4-bis(1-isocyanate-1-methylethyl)benzene or mixtures thereof; and polyisocyanates such as 1,3,5-triisocyanatemethylbenzene.

Examples of the alicyclic polyisocyanate include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, and 1,3- or 1,4-bis(isocyanatemethyl)cyclohexane; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1)heptane, 2-(3-isocyanatepropyl)-2,6-di(isocyanatemethyl)-bicyclo(2.2.1)heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2.2.1)heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-(2-isocyanateethyl)-2-isocyanatemethyl-2-(3-isocyanatepropyl)-bicyclo(2.2.1)heptane.

Examples of the aliphatic polyisocyanate include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-isocyanate-5-isocyanatemethyloctane.

Moreover, derivatives from the above polyisocyanates may be used. Examples of the derivatives include a dimer, a trimer, biuret, allophanate, carbodiimide, polymethylene-polyphenyl polyisocyanate (referred to as crude MDI or polymeric MDI), crude TDI, and an adduct of an isocyanate compound and a polyol with a low molecular weight.

The hydroxy-functional acrylate may be, for example, 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono(meth)acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth)acrylate. The above hydroxyl group-containing (meth)acrylates may be used alone or in combination of two or more.

Polyether-based, aliphatic urethane acrylate compounds are available from UCB Chemical Corp. They are sold under the name Ebecryl, and include Ebecryl 230. Polyester-based, aliphatic urethane acrylate oligomers are available from Sartomer or from Henkel (Ambler, Pa.). They are sold under the name CN966xxx, including CN966J75, and Photomer, including Photomer 6010, respectively.

The molecular weight range of the oligomer may vary from 500 to 20,000 based upon the specific requirements for properties of the primary or secondary coating in accordance with the present invention.

A free radical photoinitiator may be included in the coating composition. Suitable free radical-type photoinitiators include, for example, an acyl phosphine oxide photoinitiator, more specifically, a benzoyl diaryl phosphine oxide photoinitiator. Examples of suitable benzoyl diaryl phosphine oxide photoinitiators include: bis(2,4,6-trimethylbenzoyl)phenylphosphine oxide (Irgacure 819 available from Ciba Additives), (2,4,6-trimethylbenzoyl)

diphenylphosphine oxide (Lucerin TPO available from BASF of Parsippony, N.J.); bis(2,6-dimethoxybenzoyl)-2,4,4-trimethylpentylphosphine oxide, which is a first component (25 wt %) of Irgacure 1700 available from Ciba Additives, Tarrytown, N.Y. The second component (75 wt %) of Irgacure 1700 is 2-hydroxy-2-methyl-1-phenylpropane-1-one. 2-hydroxy-2-methyl-1-phenylpropane-1-one is also available as an individual photoinitiator named Darocur 1173. Further examples of free radical-type photoinitiators include: hydroxycyclohexylphenylketone; hydroxymethylphenylpropanone; dimethoxyphenylacetophenone; 2-methyl-1-[4-(methylthio)phenyl]-2-morpholino propan-1-one; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-2(2-hydroxy-2-propyl)-ketone; diethoxyphenyl acetophenone; 2,4,6-trimethylbenzoyl diphenylphosphone; and mixtures of the foregoing.

The free radical photoinitiator may be a mixture of phosphine oxide photoinitiators an example of which is Darocur 4265. Free radical-type photoinitiators suitable for use in the present invention are available from Ciba Additives. They are sold under the names Irgacure® and Darocur®.

The free radical-type photoinitiator may be used in an amount of 10% or less by weight, for example, about 0.25 to about 5% by weight, e.g., about 3% by weight based upon the total weight of the composition.

A single reactive diluent or mixture of reactive diluents may be included in the coating composition. While not wishing to be bound by theory, it is theorized that, during the polymerization of the urethane acrylate oligomer, the reactive diluent(s) hooks together chains of the urethane acrylate oligomer. Adequate curing of the coating compositions of the present invention is promoted by the presence of the reactive diluent(s). The reactive diluent also functions as a solvent for the urethane acrylate oligomer. The use of the reactive diluent(s) allows the formulator to adjust the viscosity of the solution to improve processability.

The reactive diluent(s) may, for example, be a lower molecular weight, liquid acrylate-functional compound including the following diacrylates and monofunctional acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, ethoxylated bisphenol-A diacrylate, and isobornyl acrylate. Another example of a reactive diluent is n-vinyl caprolactam.

The present radiation curable coating compositions may be free of non-reactive diluents, such as water or organic solvents, which lack ethylenic unsaturation.

The reactive diluent(s) may be used in the coating composition in an amount of about 80% or less by weight, for example, from about 5 to about 60% by weight, e.g., about 20% by weight, based upon the total weight of the composition.

The primary coating composition may include an adhesion promoter. Examples of adhesion promoters include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. The organofunctional silane may be mercaptoalkyl trialkoxyl silane, a methacryloyxlalkyl trialkoxy silane, an aminoalkyl trialkoxyl silane, a vinyl trialikoxyl silane, 3-aminopropyltriethoxy silane, 3-methacryloxypropyltrimethoxy silane, gamma-mercaptopropyltrimethoxy silane, gamma-mercaptopropyl (gamma-mercaptopropyl)triethoxy silane, beta-(3,4-epoxycyclohexyl)ethyltrimethoxy silane, gamma-glycidoxypropyltrimethoxy silane, 3-vinylthiopropyltrimethoxy silane, vinyl-tris-(beta-methoxyethoxy) silane, vinyl triacetoxy silane, and mixtures thereof. A particular adhesion promoter is KBM 803 available from Shin-Etsu Silicones of America, Inc, of Torrance, Calif.

The adhesion promoter, if used, may be present in the primary coating composition in an amount of from about 0.1 to about 10% by weight, for example, from about 0.1 to about 3% by weight, and, e.g., from about 0.1 to about 1% by weight, based upon the total weight of the composition.

Other components that may be utilized in the coating composition include antioxidants, flow control agents, sensitizers, stabilizers, lubricants and wetting agents.

The foregoing coating components may be mixed or blended together using any known equipment and an optical fiber may be coated with the coating composition by any known optical fiber production technique.

The techniques may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Examples of optical fiber coating techniques that may be utilized in the present invention include the methods disclosed in U.S. Pat. Nos. 4,512,281, 4,531,959, 4,539,219, 4,792,347, and 4,867,775.

EXAMPLE 1

Optical Fiber Primary Coating Composition

Two primary coating compositions were compared.

The first primary coating composition (A) comprised OD1-65, a standard primary coating composition without photoinitiator, available from DSM. To the OD1-65 was added: (i) 4 wt % of photoinitiator, specifically Darocur 4265 of Ciba Additives and (ii) 1.5 wt % of styrene.

The second primary coating composition (B) comprised OD1-65, to which was added: (i) 4 wt % of photoinitiator, specifically Darocur 4265 and (ii) 1.5 wt % of a saturated solution of $C_{60}$ fullerenes in styrene.

A CM 1000 Cure Monitor, available from Spectra Group Ltd. of Maumee, Ohio was used. Experiments were run at ambient temperature, and the temperature of the sample was not controlled. Polymerization was initiated by the excitation light of the spectrofluorimeter, which was selected to have a wavelength $\lambda$ of 380 nm. A fluorescent probe, 4-dimethylamino-4'-nitrostilbene (DMANS) available from Acros, was added in the level of $5 \times 10^{-4}\%$ to the compositions under investigation.

In order to monitor the photopolymerization of monomers, samples were prepared in a way recommended in the device manual. Namely, a "resin sandwich" was prepared between two standard microscope slides. An adhesive tape having a thickness of approximately 0.1 mm was used as a spacer. Slides were pressed to each other with spring clips. Samples were prepared in the air or under an intensive flush of nitrogen or argon prior to laminating a sample between glass plates. A cured sample demonstrates a blue-shifted emission maximum of DMANS.

FIG. 1 shows the maximum observed span for cured profiles of resins in the presence of $C_{60}$ fullerenes and in the absence of $C_{60}$ fullerenes. Two of the curves, A1 and A2, represent two experimental runs conducted with the primary coating composition A. The other two curves, B1 and B2, represent two experimental runs conducted with the primary coating composition B.

As demonstrated by FIG. 1, the addition of 1.5 wt % of a saturated solution of $C_{60}$ fullerenes in styrene accelerates the cure of a standard primary coating composition, due to the activity of $C_{60}$ fullerenes as initiators of free-radical reactions capable of harvesting not only UV light, but visible light as well. Thus, it has surprisingly been found that the addition of $C_{60}$ fullerenes accelerates the crosslinking of difunctional acrylates in a primary coating composition, which will allow for faster draws of optical fiber.

EXAMPLE 2

Kinetics of Cure of Optical Fiber Primary Coating Composition

Two primary coating compositions were compared.

The first primary coating composition comprised OD1-66, a standard primary coating composition with photoinitiator, available from DSM. To the OD1-66 was added 1.5 wt % of styrene.

The second primary coating composition comprised OD1-66, to which was added 1.5 wt % of a saturated solution of $C_{60}$ fullerenes in styrene.

A Magna 550 FT IR spectrometer available from Nicolet of Madison, Wis. was used in ATR mode. SERIES software was used to monitor the kinetics of the first and second primary coating compositions.

A thin layer of coating was placed on the diamond crystal of the spectrometer. A sample was flushed by nitrogen before and during the experiment. The temperature of the samples was ambient temperature. The first or second primary coating compositions were irradiated by a UV spot light, source model Lightnincure 200 available from Hamamatsu of Bridgewater, N.J. Disappearance of acrylate groups, which has a characteristic absorption band at 810 cm$^{-1}$, was monitored. The kinetics of the polymerization satisfactorily fit into first-order law.

In particular, the photopolymerization of the first primary coating composition (OD1-66 containing 1.5 wt % styrene) was characterized by a rate constant k=0.18 s$^{-1}$. On the other hand, the photopolymerization of the second primary coating composition (OD1-66 containing 1.5 wt % of a saturated solution of $C_{60}$ fullerenes in styrene) was characterized by a rate constant k=0.32 s$^{-1}$. Thus, the presence of $C_{60}$ fullerenes in the second primary coating composition accelerated the polymerization in comparison with the first primary coating composition that did not contain any fullerenes.

EXAMPLE 3

PhotoDSC Experiments on Formulations With and Without Fullerenes

Two primary coating compositions were compared.

The first primary coating composition comprised OD1-66, to which was added 1.5 wt % of styrene.

The second primary coating composition comprised OD1-66, to which was added 1.5 wt % of a saturated solution Of $C_{60}$ fullerenes in styrene.

PhotoDSC experiments measure the heat evolved from samples that are exposed to photoinitiating levels of radiation for a certain amount of time in order to stimulate a chemical reaction with the release (or absorption) of heat. In the present case, a Perkin-Elmer DSC7 (Norwalk, Conn.) was used with full light from 100 W mercury xenon lamp at 50° C. A nitrogen flush was conducted for 5 minutes prior to each experimental run. Irradiation of a sample for 0.05 min resulted in the release of the following amount of heat:

| | |
|---|---|
| 1$^{st}$ primary coating composition | 216 J/g |
| 2$^{nd}$ primary coating composition | 255 J/g |

The results indicate that for short irradiation periods, there was a larger conversion of acrylate groups in the coatings that include $C_{60}$ fullerenes.

EXAMPLE 4

Two Crimary Coating Compositions Were Compared

The first primary coating composition included Desmodur W, a diisocyanate (bis(4-isocyanatocyclohexyl)methane) available from Bayer of Pittsburgh, Pa. Specifically, the first primary coating had the following composition:

35 g of Desmodur W;

1.0 g of dibutyltin dilaurate, a tin catalyst available from Aldrich of Milwaukee, Wis.;

180 g of Acclaim 2220N, which is a polyethylene-polypropylene glycol available from Bayer;

0.2 g of 2,4,6-tri-tert-butyl phenol (antioxidant) available from Aldrich;

40 g of SR489, a reactive diluent available from Sartomer of Exton, Pa.;

30 g of SR506, a reactive diluent from Sartomer;

2 g of N-vinyl-2-caprolactam, which is available from ISP Technologies of Wayne, N.J.;

13 g of 2-hydroxyethylacrylate, available from Aldrich;

0.02 g of BYK 331, a flow control additive available from BYK Chemical USA of Wallingford, Conn.;

3 g of Irgacure 819, available from Ciba Additives; and 5 g of N-methyldiethanolamine, available from Aldrich.

The second primary coating composition included Desmodur W, in which $C_{60}$ fullerenes were dissolved. The solubility of the $C_{60}$ fullerenes in Desmodur W was 3 g of $C_{60}$ fullerenes per 100 g of Desmodur W. The saturated solution of $C_{60}$ fullerenes dissolved in Desmodur W had a pink color. Specifically, the second primary coating had the following composition:

35 g of saturated solution of $C_{60}$ fullerenes in Desmodur W;

1.0 g of dibutyltin dilaurate;

180 g of Acclaim 2220N;

0.2 g of 2,4,6-tri-tert-butyl phenol;

40 g of SR489;

30 g of SR506;

2 g of N-vinyl-2-caprolactam;

13 g of 2-hydroxyethylacrylate;

0.02 g of BYK 331;

3 g of Irgacure 819; and 5 g of N-methyldiethanolamine.

The first and second primary coating compositions were prepared in the standard manner for difunctional urethane acrylates. In particular, Desmodur W (by itself in the first composition, as saturated solution with $C_{60}$ fullerenes in the second composition) reacted with Acclaim 2220N at elevated temperatures. The remaining non-reacted isocyano groups were endcapped with 2-hydroxyethyl acrylate. N-methyldiethanolamine did not react with the isocyanate.

Both the first and second liquid primary coating compositions had molecular weights of 8,700 g/mol.

A cured coating formed from the first liquid primary coating composition was characterized by a glass transition temperature $T_g$ of −18° C., a modulus of 1.4 MPa, and an elongation to break of 144%.

A cured coating formed from the second liquid primary coating composition was characterized by a $T_g$ of −15° C., a modulus of 1.7 MPa, and an elongation to break of 120%.

Furthermore, the kinetics of the cure of the first and second primary coating compositions were analyzed in the same manner as in Example 2. Specifically, a Magna 550 FT IR spectrometer available from Nicolet of Madison, Wis. was used in ATR mode. SERIES software was used to monitor the kinetics.

A thin layer of coating was placed on the diamond crystal of the spectrometer. A sample was flushed by nitrogen before and during the experiment. The temperature of the samples was ambient temperature. The first or second primary coating composition was irradiated by a UV spot light, source model Lightnincure 200 available from Hamamatsu. Disappearance of acrylate groups, which has a characteristic absorption band at 810 cm$^{-1}$, was monitored. The kinetics of the polymerization satisfactorily fit into first-order law.

In particular, the photopolymerization of the first primary coating composition (containing Desmodur W without fullerenes) was characterized by a rate constant k=0.15 s$^{-1}$. On the other hand, the photopolymerization of the second primary coating composition (containing $C_{60}$ fullerenes in saturated solution with Desmodur W) was characterized by a rate constant k=0.20 s$^{-1}$.

Thus, primary coating compositions containing fullerenes dissolved in diisocyanate cured faster than primary coating compositions that did not contain any fullerenes, while cured coatings formed from the first primary coating composition exhibited comparable mechanical properties to cured coatings formed from the second primary coating composition.

What is claimed is:

1. A liquid, radiation curable composition for coating an optical waveguide, the composition comprising (a) a radiation curable oligomer, (b) a free radical photoinitiator, (c) a reactive diluent or mixture of reactive diluents, and (d) fullerenes.

2. The liquid, radiation curable composition of claim 1, wherein the radiation curable oligomer is a urethane acrylate oligomer.

3. The liquid, radiation curable composition of claim 1, wherein the fullerenes have the formula $C_{2n}$ and n is greater than 15.

4. The liquid, radiation curable composition of claim 1, wherein the fullerenes are $C_{60}$ fullerenes.

5. The liquid, radiation curable composition of claim 1, wherein the liquid, radiation curable composition is a primary or secondary coating composition and the fullerenes are added to the primary or secondary coating composition in saturated solution with either diisocyanate or polymerizable solvent.

6. The liquid, radiation curable composition of claim 5, wherein the saturated solution is prepared by dissolving from about 0.05 wt % to about 3 wt % of the fullerenes in either diisocyanate or polymerizable solvent, based on the weight of either the diisocyanate or the polymerizable solvent.

7. The liquid, radiation curable composition of claim 6, wherein the fullerenes are solid fullerenes prior to being dissolved in either the diisocyanate or polymerizable solvent.

8. The liquid, radiation curable composition of claim 5, wherein the liquid, radiation curable composition comprises from 1 to 3 wt % of the saturated solution.

9. The liquid, radiation curable composition of claim 8, wherein the liquid, radiation curable composition is a primary coating composition.

10. The liquid, radiation curable composition of claim 5, wherein the liquid, radiation curable composition is a primary or secondary coating composition and the fullerenes are added to the primary or secondary coating composition in saturated solution with diisocyanate.

11. The liquid, radiation curable composition of claim 1, further comprising an adhesion promoter.

12. The liquid, radiation curable composition of claim 11, wherein the liquid, radiation curable composition comprises from 0.1 to 10 wt % of the adhesion promoter.

13. An optical waveguide coated with the liquid, radiation curable composition of claim 1.

14. A method of coating an optical waveguide with the liquid, radiation curable composition of claim 1, the method comprising the steps of:

(a) contacting the optical waveguide with said liquid, curable composition; and (b) curing the liquid, radiation curable composition.

15. The optical waveguide of claim 13, wherein the radiation curable oligomer is a urethane acrylate oligomer.

16. The optical waveguide of claim 13, wherein the fullerenes have the formula $C_{2n}$ and n is greater than 15.

17. The optical waveguide of claim 13, wherein the fullerenes are C60 fullerenes.

18. The optical waveguide of claim 13, wherein the liquid, radiation curable composition is a primary or secondary coating composition and the fullerenes are added to the primary or secondary coating composition in saturated solution with either diisocyanate or polymerizable solvent.

19. The optical waveguide of claim 18, wherein the saturated solution is prepared by dissolving from about 0.05 wt % to about 3 wt % of the fullerenes in either diisocyanate or polymerizable solvent, based on the weight of either the diisocyanate or the polymerizable solvent.

20. The optical waveguide of claim 19, wherein the fullerenes are solid fullerenes prior to being dissolved in either the diisocyanate or polymerizable solvent.

21. The optical waveguide of claim 18, wherein the liquid, radiation curable composition comprises from 1 to 3 wt % of the saturated solution.

22. The optical waveguide of claim 21, wherein the liquid, radiation curable composition is a primary coating composition.

23. The optical waveguide of claim 18, wherein the liquid, radiation curable composition is a primary or secondary coating composition and the fullerenes are added to the primary or secondary coating composition in saturated solution with diisocyanate.

24. The optical waveguide of claim 13, further comprising an adhesion promoter.

25. The optical waveguide of claim 24, wherein the liquid, radiation curable composition comprises from 0.1 to 10 wt % of the adhesion promoter.

* * * * *